United States Patent [19]
Arnold et al.

[11] 3,784,466
[45] Jan. 8, 1974

[54] OIL AND GAS TREATMENT

[75] Inventors: Thomas B. Arnold; Eugene B. Byrnes, both of Dallas; Alonzo R. Castoe, Irving, all of Tex.

[73] Assignee: Atlantic Richfield Company, New York, N.Y.

[22] Filed: July 28, 1972

[21] Appl. No.: 276,143

Related U.S. Application Data

[62] Division of Ser. No. 100,905, Dec. 23, 1970, Pat. No. 3,702,296.

[52] U.S. Cl. .............................. 208/361, 208/340
[51] Int. Cl. .............................................. C10g 7/00
[58] Field of Search ................... 208/351, 352, 361, 208/340

[56] References Cited
UNITED STATES PATENTS

| | | | |
|---|---|---|---|
| 2,322,635 | 6/1943 | Keith | 208/351 |
| 2,327,896 | 8/1943 | Houghland | 208/361 |
| 2,368,497 | 1/1945 | Shipley et al. | 208/361 |

*Primary Examiner*—Herbert Levine
*Attorney*—Roderick W. MacDonald

[57] ABSTRACT

Methods for treating oil and gas to stabilize the oil by removing the gas and to make the gas meet specifications such as dew point. The oil is stabilized by subjecting same to flash conditions and the extent of flashing is controlled by adding to the oil a more volatilizeable material of varying liquid and gas content. The gas is prepared to meet specifications by cooling followed by contacting with at least one solvent which has a greater affinity for heavier hydrocarbons, carbon dioxide, hydrogen sulfide, and water than for methane, ethane, and propane.

8 Claims, 2 Drawing Figures ns
3,784,466

1

OIL AND GAS TREATMENT

CROSS REFERENCES TO RELATED APPLICATIONS

This application is a division of application Ser. No. 100,905, filed Dec. 23, 1970 now U.S. Pat. No. 3,702,296.

BACKGROUND OF THE INVENTION

Heretofore in stabilizing a gas-containing oil, i.e., a liquid oil stream that contains some gas therein, distillation towers have been employed in order to remove from the oil the desired gas components without also removing substantial amounts of heavier hydrocarbons, butane ($C_4$) and heavier. This was to minimize sacrifice in oil quality by loss of heavier hydrocarbons from the oil and to see that the gas, after removal, is not contaminated with readily condensable heavier hydrocarbons.

A disadvantage to this approach is that distillation towers not only are expensive, but also are very difficult to transport to, set up at, and operate in remote parts of the world such as in arctic regions. Therefore, it is desirable to have a compact system which does not rely upon tall distillation towers to effect a clean removal of desired gas components from a liquid oil while minimizing the amount of heavier hydrocarbons removed from the oil with the gas.

Heretofore various solvents have been employed to remove carbon dioxide and hydrogen sulfide from hydrocarbonaceous gases such as natural gas. However, it has been taught by those skilled in the art that a disadvantage of these solvents is their affinity for heavier hydrocarbons.

SUMMARY OF THE INVENTION

According to one aspect of this invention there is provided a method by which an oil is stabilized by removal of gas therefrom without reliance upon distillation towers and for utilizing a solvent which has an affinity for carbon dioxide, hydrogen sulfide, water, and heavier hydrocarbons in producing a gas product which meets specifications as to hydrocarbon dew point, water dew point, carbon dioxide and hydrogen sulfide maximum content.

In another aspect, there is provided a method by which a hydrocarbonaceous oil is stabilized by removing both organic and inorganic (acid) gases therefrom by subjecting the oil to flash and stripping conditions, receiving vaporized gases from the flashing and stripping zone or zones, cooling the recovered gases to liquefy the heavier hydrocarbonaceous components, separating the non-liquefied hydrocarbonaceous components, treating the remaining liquefied hydrocarbonaceous components to partially vaporize same and to form a stream containing a mixture of vaporized and liquid heavier hydrocarbons, and returning this stream which is rich in easily vaporizable heavier hydrocarbons to liquid oil which is to be subjected to flash and stripping conditions. In this method greater flashing is achieved, and therefore greater cooling of the oil effected, because of the addition of the stream of more easily vaporizable heavier hydrocarbons. The degree of cooling of the oil during flashing can be controlled by controlling the amount of easily vaporizable liquid present in the heavier hydrocarbon stream added to the liquid oil to be flashed and stripped.

In another aspect of this invention, a gas stream such as that obtained from the stabilization of oil as described hereinabove is treated. The gas contains methane, ethane and propane which are desirably retained in the gas, heavier hydrocarbons ($C_4+$, particularly $C_4$ through $C_{10}$) which are desirably retained in the liquid oil, and carbon dioxide and hydrogen sulfide which are preferably kept at a minimum in the gas to minimize corrosion potential in pipelines, and the like. The gas is cooled to substantially liquefy the heavier hydrocarbons and then contacted with one or more solvents which have an affinity for heavier hydrocarbons, carbon dioxide, hydrogen sulfide, and water that is greater than affinity for methane, ethane, and propane. The solvent sorbs, and therefore removes heavier hydrocarbons, carbon dioxide, hydrogen sulfide, and water from the non-liquefied gases. After contacting with the solvent, the remaining gas is composed of a major amount of methane, ethane, and propane with sufficient water and heavier hydrocarbons removed to meet a desired hydrocarbon dew point and water dew point and with sufficient carbon dioxide and hydrogen sulfide removed to meet specification requirements as to maximum tolerable amounts of these inorganic gases. The solvent can then be regenerated such as by removing absorbed components individually or in any desired combination of two or more.

Accordingly, it is an object of this invention to provide a new and improved method for stabilizing liquid oil that contains a gas. It is another object to provide a new and improved method for stabilizing oil and producing a natural gas product which meets dew point requirements and carbon dioxide and hydrogen sulfide limits. It is another object to provide a new and improved method for processing a hydrocarbonaceous gas to meet water and hydrocarbon dew point requirements and carbon dioxide and hydrogen sulfide limits. It is another object to provide a new and improved method for stabilizing oil without utilizing distillation towers. It is another object to provide a new and improved method for treating natural gas to meet specification requirements. It is another object to provide a new and improved method which will stabilize oil by removal of the gas therefrom utilizing controllable flash conditions and which will produce a gas product that meets specification requirements, particularly as to dew points and carbon dioxide and hydrogen sulfide concentration limits.

Other aspects, objects, and advantages of this invention will be apparent to those skilled in the art from this disclosure and the appended claims.

DETAILED DESCRIPTION OF THE INVENTION

Figure 1:
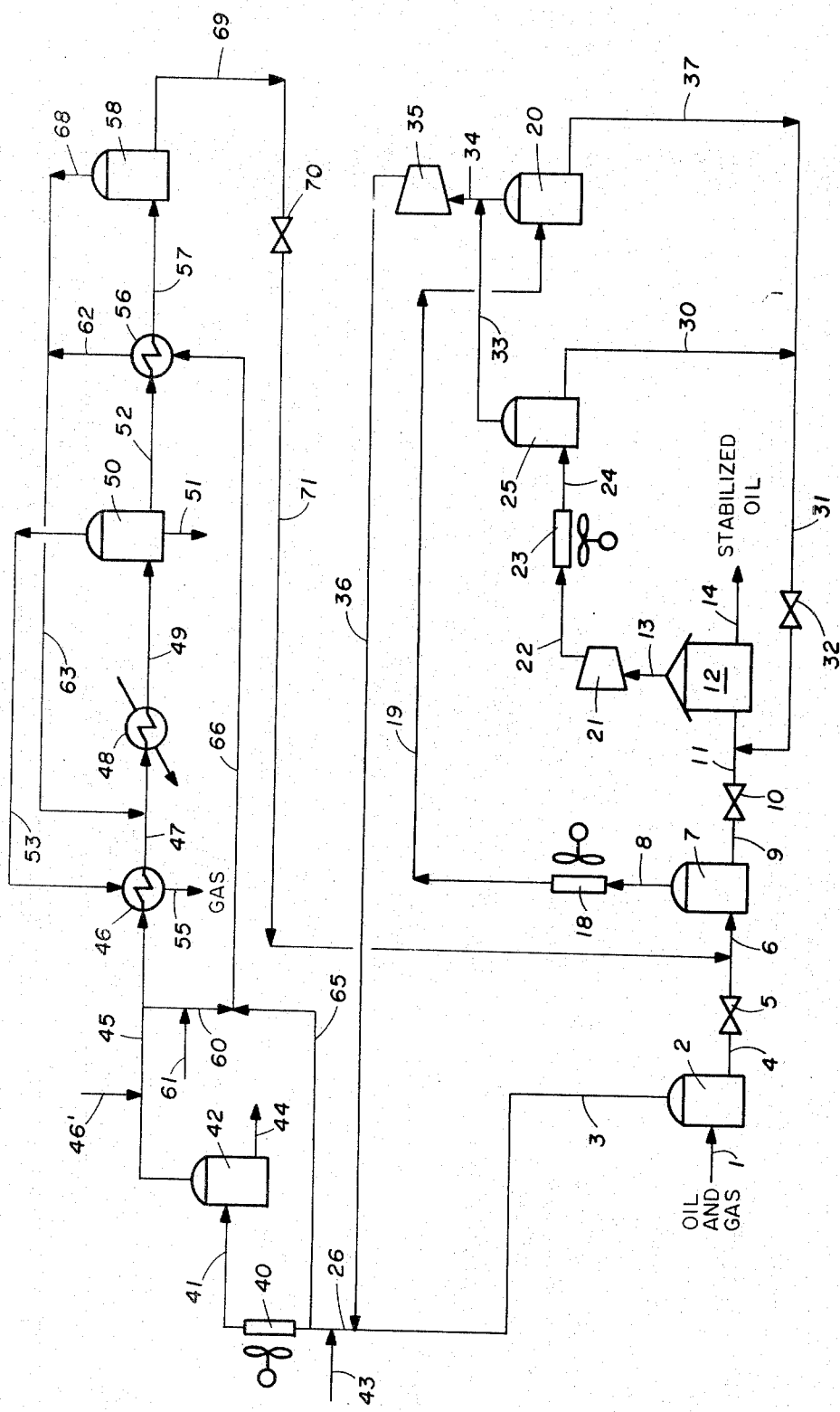
FIG. 1 shows a flow diagram according to this invention for stabilizing a liquid oil and producing a gas product.

More specifically, FIG. 1 shows a source of pressurized gas containing oil in pipeline 1 which has its pressure partially reduced in pipeline 1 by way of an expansion valve, or simple pressure letdown due to the length of the pipeline, and the like. The pressurized gas containing oil enters separator 2 and because of the partial pressure letdown, some gas separates from the liquid oil and passes overhead into pipe 3. The remaining liquid oil passes out of separator 2 by way of pipe 4, through expansion valve 5, and, by way of pipe 6, into separator 7 wherein additional gas, produced by the additional pressure letdown, separates from the liquid oil and is removed overhead by way of pipe 8. The liquid oil remaining is removed from separator 7 by way of pipe 9, passes through expansion valve 10 and, by way of pipe 11 into storage tank 12. Storage tank 12 is substantially at atmospheric pressure and this final pressure letdown to atmospheric allows the evolution of additional gas which is removed by way of pipe 13. Stabilized liquid crude oil is removed from storage tank 12 by way of pipe 14 for use, transportation, or other disposition as desired.

The gas removed overhead by way of pipes 3, 8, and 13 will be rich in methane, ethane, and propane ($C_1$, $C_2$, and $C_3$) but will also contain substantial amounts of heavier hydrocarbons (butane and heavier, i.e., $C_4+$), water, carbon dioxide, and hydrogen sulfide. The heavier hydrocarbons are desirably kept with the liquid oil and the carbon dioxide, water and hydrogen sulfide are preferably substantially completely removed from the gas before it is to be considered an adequate quality gas product.

The gas removed by way of pipe 8 is cooled such as by way of a conventional fin-fan cooler 18, or any other conventional cooling device and then passed by way of pipe 19 into separator 20. The gas in pipe 13, which is at a substantially lower pressure than that in either of pipes 3 and 8 is compressed in a conventional compressor 21 and then passed by way of pipe 22 to a conventional fin-fan cooler 23 or any other cooling device. The gas is then passed by way of pipe 24 into separator 25. Liquids that may have been formed in the processing of the gas in pipe 13 are removed from separator 25 by way of pipe 30 and returned to pipe 11 by way of pipe 31. Pipe 31 has an expansion valve 32 therein so that the liquid returns in pipes 31 and 37 will be reduced to atmospheric pressure. The overhead gas from separator 24 is passed by way of pipe 33 into the overhead from separator 20 in pipe 34. The combined overhead gases in pipe 34 pass through compressor 35 and from there by way of pipe 36 into pipe 3.

The total combined overhead gases from pipes 3, 8, and 13 pass through pipe 26 to a conventional fin-fan cooler 40 or other desired cooling device and then by way of pipe 41 into separator 42. A freezing point depressant such as mono- or polyhydric alcohols having from 1 to 10, inclusive, carbon atoms per molecule, preferably having from 1 to 4, inclusive, hydroxy radical substituents per molecule, can be used singly or in any desired mixture in pipe 3. The depressant is added by way of pipe 43 to insure that no freezing occurs if additional condensation of liquid takes place in the apparatus downstream of cooling means 40. The cooled gas in separator 42 has liquid freezing point depressant, liquid water, and the like removed therefrom by way of pipe 44. Gas is removed overhead from separator 42 by way of pipe 45. Additional freezing point depressant material can be added by way of pipe 46'.

The gas then passes through a gas-to-gas heat exchanger 46 wherein it is cooled. The gas exits from heat exchanger 46 by way of pipe 47 and passes into cooling means 48 which can be a mechanical refrigeration unit, and the like. The gas has by this time been cooled to the point where substantially all the heavier hydrocarbons are liquefied thereby leaving primarily methane, ethane, propane, carbon dioxide, and hydrogen sulfide in the gaseous state. Water has also been liquefied along with the heavier hydrocarbons. The thus cooled gas is removed from cooling means 48 by way of pipe 49 and passed into separator 50 from which the liquid freezing point depressant containing liquid water is removed by way of pipe 51, liquefied heavier hydrocarbons removed by way of pipe 52, and non-liquefied gases removed by way of pipe 53.

The non-liquefied gases are utilized in heat exchanger 46 and thus are used as a cooling medium in the system of cooling means 40, 46, and 48. The warmed gas product exits from cooling means 46 by way of pipe 55 for further disposition as desired. The liquefied heavier hydrocarbons pass through heat exchanger 56 and from there by way of pipe 57 pass to separator 58. Relatively warm gas in pipe 45 can be removed therefrom by way of pipe 60, additional freezing point depressant having been added by way of pipe 61, if desired, and passed by way of pipe 66 through heat exchanger 56 to be cooled by liquefied heavier hydrocarbons from pipe 52.

The cooled gas from pipe 66 passes by way of pipes 62 and 63 to pipe 47. Thus, the refrigerating potential of the liquefied hydrocarbons in pipe 52 is conserved by cooling of gas from pipe 61 in heat exchanger 56. If it is desired to heat the liquefied heavier hydrocarbons in pipe 52 to a higher temperature, still warmer gas can be taken from pipe 26 by pipe 65 and passed by way of pipe 66 through heat exchanger 56. Vapors separated in separator 58 can be returned by way of pipe 68 to pipe 63 and therefore pipe 47 for recooling in cooling means 48. Liquefied heavier hydrocarbons are removed from separator 58 by way of pipe 69, pass through expansion valve 70 and then into pipe 71 for return to pipe 6.

The liquid hydrocarbons in pipe 69, having come from vaporized hydrocarbons of pipes 3, 8, and 13, are relatively easily vaporizable materials such as propane and therefore, when mixed with the liquid oil in pipe 6 which is to be subjected to flash and stripping conditions, will more readily flash in unit 7. The gas in pipe 71 serves as a stripping medium in unit 7. The vaporization in unit 7 of these more easily vaporizable materials causes a greater cooling of the contents in unit 7 than would be achieved if only pressurized liquid oil from pipe 6 were passed into unit 7. Thus, the amount of liquid hydrocarbons present in pipe 71 has a controlling effect on the amount of cooling in unit 7 and thereby has a controlling effect on the amount of gas removed from the liquid oil in unit 7. By controlling the temperature of the liquefied hydrocarbons with heat exchanger 56, the relative amounts of gas and liquid in pipe 71 can be varied. By varying the amount of liquid in pipe 71 the extent of flashing (and therefore cooling) and the extent of stripping in unit 7 is controlled.

In this manner the amount of gas removed from the liquid oil during the flash conditions in units 7 and 12 is controlled and the liquid oil is stabilized by removal of gas therefrom without the use of towers and without substantial loss of heavier hydrocarbons from the liquid oil since it is the heavier hydrocarbons which are utilized in pipe 71 to control the extent of flashing and stripping in unit 7. Accordingly, a threefold advantage is obtained in that the heavier hydrocarbons which are desirably maintained with the liquid oil are returned to the liquid oil in pipe 6, after having been separated from the gas product in separator 50 and these same heavier hydrocarbons are utilized as the controlling medium for the extent of flashing and stripping effected in unit 7.

The gas product preferably contains a major amount of $C_1$, $C_2$, and $C_3$ hydrocarbons and a minor amount of $C_4+$ hydrocarbons and inorganic gases such as carbon dioxide and hydrogen sulfide. The heavier hydrocarbons in pipe 69 preferably contain a major amount of $C_4+$ hydrocarbons and a minor amount of $C_1$, $C_2$, and $C_3$ hydrocarbons. In this invention, unless otherwise specified, the term "major amount" includes at least about 50 mol, volume, or weight percent while the term "minor amount" includes less than 50 mol, volume, or weight percent.

In operation, the gas containing oil, e.g., crude oil, is preferably initially at a pressure of at least about 300 psia and a temperature of greater than 100°F. The gas containing oil is then adiabatically flashed in at least one flash zone down to substantially atmospheric pressure and a temperature of 100°F. or less. The overhead pressurized gas stream in pipes 3 and 36 is preferably at a pressure of at least about 300 psia and a temperature greater than about 50°F. and is cooled by the time it reaches separator 50 to a temperature of about 0°F. without substantial pressure reduction. The liquefied heavier hydrocarbons in pipe 49 are therefore cooled at least to about 0°F., and in pipe 52 are heated to a temperature greater than about 50°F. by heat exchanger 56. Heat exchanger 56 drives off controlled amounts of $C_1$ and $C_2$ which are separated from the liquefied hydrocarbons by way of pipe 68. The heavier hydrocarbons are than reduced in pressure by expansion valve 70 to below 300 psia to form the desired mixture of vaporized and liquid heavier hydrocarbons which is mixed with liquid oil in pipe 6 for subsequent flashing and stripping in unit 7.

The gas product in pipe 55 can contain substantial amounts of carbon dioxide and hydrogen sulfide if substantial amounts of these inorganic (acid) gases are present in the combined overhead gas streams in pipe 26. If it is desired to remove these inorganic gases down to a maximum amoutn allowable by a given specification, the method embodied in the flow scheme of FIG. 2 can be employed.

Figure 2:
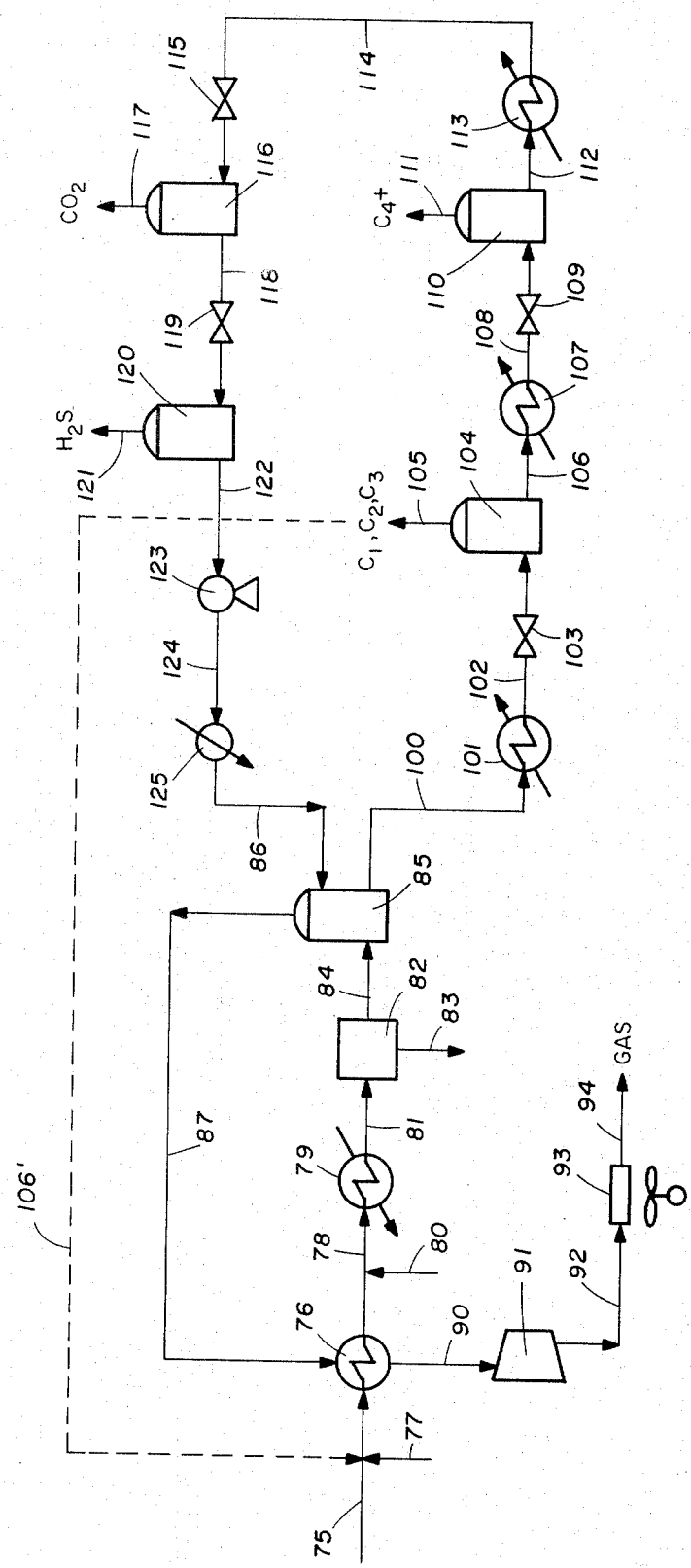
FIG. 2 shows a flow diagram for treating a gas product in accordance with this invention to insure that the product meets the specification requirements.

In FIG. 2 a hydrocarbonaceous gas stream containing methane, ethane, propane, heavier hydrocarbons, water, carbon dioxide, and hydrogen sulfide, for example the stream in pipe 55 of FIG. 1, passes by way of pipe 75 into a gas-to-gas heat exchanger 76. Here also, one or more freezing point depressants can be added by way of pipe 77. The cooled gas exiting from heat exchanger 76 passes by way of pipe 78 into cooling means 79 which can be the same as cooling means 48 of FIG. 1. Here also additional freezing point depressant can be added by way of pipe 80. The gas, now cooled to a point where substantially all the heavier hydrocarbons and water are liquefied, e.g., down to 20°F. or lower passes by way of pipe 80 to a separator means 82 wherein liquid freezing point depressant containing liquid water is removed by way of pipe 83 and the remaining mixture of liquid and gas passes by way of pipe 84 to a solvent contacting means 85.

In unit 85 liquid solvent is introduced by way of pipe 86 and passes downwardly in countercurrent contact with rising gases which contain a major amount of methane, ethane, and propane and minor amounts of carbon dioxide, hydrogen sulfide, and also heavier hydrocarbons and water which have not been liquefied. The solvent employed has a greater affinity for heavier hydrocarbons, water, carbon dioxide, and hydrogen sulfide than for methane, ethane, and propane. The solvent therefore substantially depletes the rising gases as to the components for which it has a greater affinity thereby producing an overhead gas product in pipe 87 which contains a major amount of the desired methane, ethane, and propane components and which is substantially depleted in heavier hydrocarbons and water. Thus, the gas has low water and hydrocarbon dew points and is also low in carbon dioxide and hydrogen sulfide. The hydrocarbons sorbed (absorbed, adsorbed, and the like) by the solvent can therefore be composed of a major amount of $C_3+$ and a minor amount of $C_1$ and $C_2$. Depending upon the particular solvent more $C_3$ can be sorbed by the solvent than stays in the gas and vice versa.

The gas product in pipe 87 is the product of the method which can meet strenuous specifications as to dew points and maximum contents of inorganic gases. The cooled product gas can be used as such or can be passed by way of pipe 87 through heat exchanger 76 to conserve some of the refrigeration potential of the gas in pipe 87. The warmed product gas is removed from heat exchanger 76 by way of pipe 90 and passed through compressor 91 wherein it is compressed to a desired operating pressure such as a required pipeline pressure and then passed by way of pipe 92 through a cooling means such as fin-fan cooler 93 after which the gas in pipe 94 is ready for introduction into a pipeline, storage, use, or other disposition as desired.

The mixture of liquefied heavier hydrocarbons and liquid solvent with methane, ethane, propane, heavier hydrocarbons, carbon dioxide, hydrogen sulfide, and water sorbed thereon is removed from contactor 85 by way of pipe 100, heated by heating means 101 and passed by way of pipe 102 through expansion valve 103 into flash zone 104. The pressure is reduced sufficiently in zone 104 to flash off only the methane, ethane, and propane. The methane, ethane, and propane are removed alone as a gas by way of pipe 105 and can be utilized separately or kept within the system such as by recycling by way of dotted line 106' to pipe 75. The remaining liquefied heavier hydrocarbons and rich solvent is removed from unit 104 by way of pipe 106, passed through heating means 107, and then passed by means of pipe 108 through expansion valve 109 into flash zone 110. In unit 110 the pressure is reduced sufficiently to cause the flashing of only the heavier hydrocarbons which are removed from the system by way of pipe 111. The product in pipe 111 can be combined with liquid oil such as that in pipe 6 of FIG. 1 if desired.

The liquid solvent is removed from unit 110 by way of pipe 112, heated with heating means 113 and passed by way of pipe 114 through expansion valve 115 into flash unit 116 wherein the pressure is sufficiently reduced to cause flashing of only the carbon dioxide. The $CO_2$ is removed as a gas overhead by way of pipe 117. The liquid solvent is removed from unit 116 by way of pipe 118 and with or without additional heating, is passed through expansion valve 119 for further pressure reduction into flash unit 120. In flash unit 120 hydrogen sulfide is removed as a gas overhead product by way of pipe 121. The water absorbed by the solvent is also removed in this process in one or more of the flash units 104, 110, 116, and 120. It should be noted that two or more of the flash units shown in FIG. 2 can be combined to produce combined gas products. For example, units 116 and 120 can be combined so as to remove a gas product containing all the carbon dioxide and hydrogen sulfide. Similarly, units 110 and 116 can be combined by suitable adjustment of temperature and pressure so as to remove a single gas stream containing all of the heavier hydrocarbons and carbon dioxide. The solvent can be regenerated in any other known manner such as by the use of one or more conventional unit operations such as distillation, flashing, stripping, filtering, settling, and the like.

The now regenerated solvent is removed from unit 120 by way of pipe 122, passed through pump 123 to repressurize the solvent substantially to the operating pressure of contactor 85, passed by way of pipe 124 through cooling means 125 to reduce the temperature of the pressurized solvent to the temperature obtained in contactor 85 and then returned by way of pipe 86 for reintroduction into contactor 85. Makeup solvent can be added at any point along the line such as at pipe 122 if the makeup solvent is at a lower pressure than desired for use in contactor 85.

More than one solvent can be employed together and/or in sequence. Thus, the term "solvent" as used herein includes a single solvent or a mixture of two or more solvents. A solvent mixture can be tailored to remove certain materials depending on the characteristics of the feed oil. For example, a solvent which has a special affinity for hydrocarbons can be used in combination with a solvent being a special affinity for $H_2O$, and so on up to the point where there is one solvent for each material to be removed. By thus tailoring the solvent mixture a greater degree of removal of various materials can be obtained. For example, extremely low hydrocarbon and water dew points can be achieved if one solvent in the mixture has a special affinity for hydrocarbon and another solvent in the mixture a special affinity for water.

The solvents used can be added at one or more points along the line of flow in the process and at each point of addition an individual solvent or a mixture of two or more solvents can be added. The solvents can be recovered individually or in mixture and regenerated individually or in mixture. A recovered mixture of solvents can be separated into individual solvents before regeneration if desired. For example, when a mixture of solvents is employed it is preferred that two or more of the solvents be immiscible so that they will voluntarily separate into individual layers under the influence of gravity alone. The layers of solvent can then be readily separated from one another and regenerated independently of one another.

It can be seen that the solvent employed in this invention is utilized to its greatest benefit in that it is employed to remove not only carbon dioxide and hydrogen sulfide from the gas being processed but also to remove heavier hydrocarbons and water so that the gas being processed can meet set requirements for both hydrocarbon dew point and water dew point. There are a substantial number of commercially available solvents which have an affinity for heavier hydrocarbons, water, carbon dioxide, and hydrogen sulfide greater than their affinity for methane, ethane, and propane and all of these solvents are operable in this invention. Because there are a wide number of solvents commercially available for use in the method of this invention, because these solvents vary widely as to chemical composition, because varying amounts of different heavier hydrocarbons, carbon dioxide, hydrogen sulfide, and water may be sorbed by different solvents acting on different gas streams, it is substantially impossible to give pressure and temperature limits for the regeneration of the solvent. This is particularly so since combinations of two or more gases may be desirably removed together rather than separately. However, a series of heating and/or flash steps such as that shown in FIG. 2 can be employed to regenerate any given solvent. Suitable solvents known in the art and commercially available, but by no means all of the available solvents, are acetone, propylene carbonate, dimethylether polyethyleneglycol, n-methyl-2-pyrrolidone, and methanol.

In the method of FIG. 1, substantially all of the heavier hydrocarbons that can be removed from the gas are generally liquefied and all of these return by way of pipes 69 and 71 to pipe 6. Thus, there is no limit other than a practical limit as to the quantity or variety of material returned to pipe 6 by way of pipes 69 and 71. The control of the extent of flashing and stripping carried on in units 7 and 12 is set by the degree of heating in exchanger 56. The more liquid and gas in pipe 71, the greater the flashing and stripping in units 7 and 12, and vice versa. If less flashing and stripping are desired in units 7 and 12, the temperature increase obtained by heating means 56 can be used to control the extent of degasification of the oil being processed in units 7 and 12.

It can be seen from the processes of FIGS. 1 and 2 that $C_3$ is the dividing line between the gas product and the hydrocarbons returned to, for example, pipe 6, to control flashing and stripping and that $C_3$, depending on varying process conditions, can be present to greater or lesser degrees in either the gas product or the returned hydrocarbons or both.

EXAMPLE

Inlet crude oil containing 52 mol percent $C_1$, $C_2$, and $C_3$ hydrocarbons, 39 mol percent $C_4$ and heavier ($C_4+$) hydrocarbons, 9 mol percent carbon dioxide and hydrogen sulfide is processed in the flow scheme shown in FIG. 1. The temperature and pressure on the inlet oil and gas in pipe 1 is substantially above 140°F. and 665 psia and is reduced to 140°F. and 665 psia in unit 2. $C_1$ and heavier hydrocarbons are removed by way of pipe 3 and the remaining liquid oil is passed to unit 7 which is at a pressure of 100 psia and a temperature of 110°F. due to adiabatic flashing downstream of expansion valve 5. Pipe 8 removes $C_1$ and heavier hydrocarbons in the gaseous state. The liquid oil then passes to unit 12 which is at 14.7 psia and 94°F. Pipe 13 also contains $C_1$ and heavier hydrocarbons but contains a major amount of $C_3$ and heavier hydrocarbons and a minor amount of $C_1$ and $C_2$. The overhead in pipe 8 is cooled to 65°F. and passed into separator 20. The overhead in pipe 13 is compressed to 100 psia and a temperature of 300°F., then cooled to 65°F. by cooling means 23 and passed into separator 25 which is at 95 psia and 65°F. Separator 20 is also at 95 psia and 65°F. The return hydrocarbon liquid in pipes 30 and 37 is adiabatically flashed downstream of expansion valve 30 substantially to 14.7 psia.

The overhead in pipe 34 is compressed by compressor 35 to a pressure of 665 psia and a temperature of 300°F. The combined overheads in pipe 26 are cooled by cooling means 40 into the range of from about 70° to about 120°F. The temperature in separator 42 is in this temperature range and at a pressure of about 660 psia. Ethylene glycol is added by way of pipe 43 and liquid ethylene glycol and water are removed by way of pipe 44. This also applied to pipes 46, 61, and 51. The gas after passing through heat exchanger 46 is at a temperature of about 30°F. and after passing through cooling means 48 is at a temperature of about 0°F. Separator 50 is at a pressure of about 645 psia and a temperature of 0°F. The overhead gas stream 53 which contains a major amount of methane, ethane, and propane with minor amounts of $C_4$ and heavier hydrocarbons, carbon dioxide, hydrogen sulfide, and water enters heat exchanger 46 at about 0° F. and is warmed to a temperature to the range of from about 20° to about 60°F.

The liquefied heavier hydrocarbons in pipe 52 are heated by heat exchanger 56 to a temperature in the range of from about 60° to about 90°F. and the temperature in separator 58 is in this range. Separator 58 is also at a pressure of about 660 psia. Pipe 69 contains a liquid hydrocarbon stream of controlled depletion in methane and ethane and therefore containing a major amount of $C_3$ and heavier hydrocarbons which are relatively easily vaporizable since they are part of the overhead vapors of units 2, 7, and 12. The composition of stream 69 is a major amount of $C_3$ and heavier hydrocarbons with only minor amounts of methane and ethane, carbon dioxide, and hydrogen sulfide. Downstream of expansion valve 70 the stream is converted into a mixture of gaseous and liquid heavier hydrocarbons at a pressure of 110 psia and a temperature of $-17°F$. and the entire stream in pipe 72 is passed into pipe 6.

The stabilized crude oil removed from unit 12 by way of pipe 14 contains 0.01 mol percent $C_1$, 0.09 mol percent $C_2$, 0.8 mol percent $C_3$, 38 mol percent $C_4$ and heavier hydrocarbons, 0.02 mol percent carbon dioxide and hydrogen sulfide. All mol percents are based upon the total inlet liquid and gas.

By taking the contents of pipe 45 and passing it through a flow scheme such as that shown in FIG. 2 a gas product can be obtained in pipe 94 of FIG. 2 which contains a major amount of methane, ethane, and propane, but which is substantially depleted as to water, carbon dioxide, hydrogen sulfide, and heavier hydrocarbon to the extent that the hydrocarbon dew point is below 0°F., the water dew point is below $-20°F.$, and the carbon dioxide and hydrogen sulfide gases are present in amounts less than 3 volume percent each. The gas product is at a temperature of 30°F. and a pressure in the range of 600 to 1,200 psia which are suitable conditions for entry into a commercial pipeline. By the use of the flow scheme of FIG. 2 strict specifications relating to dew points, and carbon dioxide and hydrogen sulfide maximum limits are met while the $C_4$ and heavier hydrocarbons are recovered for addition to a liquid product such as that in unit 12 of FIG. 1. Carbon dioxide is recovered at an elevated pressure which can save compression expense should the carbon dioxide desirably be reinjected into producing formations for secondary recovery purposes.

Reasonable variations and modifications are possible within the scope of this disclosure without departing from the spirit and scope of this invention.

The embodiments of the invention in which an exclusive property or privilege is claimed are defined as follows:

1. In a method for stabilizing oil which contains gas without the use of distillation towers, said gas-containing oil being at an elevated temperature and pressure, the improvement comprising subjecting said gas-containing oil to flash and stripping conditions in at least one flash zone, removing from said at least one flash zone a stabilized oil, separately removing from said at least one flash zone a pressurized gas stream containing $C_1$, $C_2$, $C_3$ and heavier hydrocarbon vapors, cooling said pressurized gas stream to liquefy a major amount of said heavier hydrocarbons, removing at least $C_1$ and $C_2$ gas from said cooled pressurized gas stream, treating the heavier hydrocarbons remaining in said cooled pressurized gas to produce a mixture of gaseous and liquid heavier hydrocarbons, combining said mixture of gaseous and liquid heavier hydrocarbons with additional gas-containing oil which is to be subjected to flash and stripping conditions thereby enriching said additional gas-containing oil with more easily vaporizable heavier hydrocarbons so that more extensive vaporization of liquids takes place during subsequent flashing operations on said additional gas-containing oil thereby driving off gaseous $C_1$, $C_2$, and $C_3$ and cooling said additional gas-containing oil to a greater extent than if said additional gas-containing oil alone were subjected to said subsequent flashing operations.

2. A method according to claim 1 wherein said remaining heavier hydrocarbons are heated to vary the relative amounts of gaseous and liquid heavier hydrocarbons combined with said gas-containing oil thereby varying the extent of cooling of said gas-containing oil in subsequent flashing operations and therefore controlling the extent of removal of gas from said gas-containing oil during said subsequent flashing operations.

3. A method according to claim 1 wherein the gas product contains a major amount of $C_1$, $C_2$, and $C_3$ hydrocarbons and a minor amount of $C_4+$ hydrocarbons and inorganic gases, and said heavier hydrocarbons contain a major amount of $C_4+$ hydrocarbons and a minor amount of $C_1$, $C_2$, and $C_3$ hydrocarbons.

4. A method according to claim 1 wherein said gas-containing oil is subjected to a plurality of flashing and stripping zones operating at successively lower pressures and the pressurized gas streams recovered from the lower pressure flash zones are recompressed to a higher pressure before cooling said pressurized gas stream, said pressurized gas streams are treated with a freezing point depressant, and said heavier hydrocarbons remaining in said cooled pressurized gas are heated followed by reducing part of the pressure thereon to produce a mixture of gaseous and liquid heavier hydrocarbons.

5. A method according to claim 4 wherein said gas-containing oil is crude oil at a pressure of at least about 300 psia and a temperature of at least about 100°F., said gas-containing crude oil is adiabatically flashed in a plurality of flash and stripping zones to atmospheric pressure and a temperature of less than 100°F., said pressurized gas stream contains $C_1$, $C_2$, $C_3$, and heavier hydrocarbon vapors, and is at a pressure of at least about 300 psia and a temperature greater than 50°F., said pressurized gas stream is cooled at least to 20°F. without substantial pressure reduction at which time primarily $C_1$ and $C_2$ gas is removed from the substantially liquefied heavier hydrocarbons, the remaining liquefied heavier hydrocarbons are heated to a temperature greater than 50°F. and then reduced in pressure to below 300 psia which forms a mixture of gaseous and liquid heavier hydrocarbons, and said mixture of gaseous and liquid heavier hydrocarbons is combined with said gas-containing crude oil upstream of at least one of said flash zones.

6. A method according to claim 1 wherein said pressurized gas stream containing $C_1$, $C_2$, $C_3$, and heavier hydrocarbon gas also contains $H_2O$, $CO_2$, and $H_2S$ gas, said pressurized gas stream is cooled to liquefy a major portion of said heavier hydrocarbons and thereafter water is removed from the cooled pressurized gas stream and at least the gaseous portion of said gas stream than contacted with at least one solvent which has a greater affinity for $CO_2$, $H_2S$, $H_2O$ and heavier hydrocarbons than for $C_1$, $C_2$, and $C_3$ hydrocarbons, recovering gaseous hydrocarbons not sorbed by said solvent, said recovered gaseous hydrocarbons being substantially depleted in $CO_2$, $H_2S$, $H_2O$, and heavier hydrocarbons, and separately recovering said solvent.

7. A method according to claim 6 wherein said solvent is at least one of acetone, propylene carbonate, dimethylether polyethyleneglycol, n-methyl-2-pyrrolidone, and methanol.

8. A method according to claim 6 wherein each of said groups (1) $C_1$, $C_2$, and $C_3$ hydrocarbons, (2) heavier hydrocarbons, (3) $H_2O$, (4) $CO_2$, and (5) $H_2S$ are recovered from said solvent substantially separated from one another.

* * * * *